Jan. 1, 1924. 1,479,456

H. B. CLEVELAND
DEWATERING MACHINE
Filed May 23, 1921 2 Sheets-Sheet 1

Inventor
Henry B. Cleveland

Jan. 1, 1924

H. B. CLEVELAND

DEWATERING MACHINE

Filed May 23, 1921

Inventor
Henry B. Cleveland

Patented Jan. 1, 1924.

1,479,456

UNITED STATES PATENT OFFICE.

HENRY BURDETT CLEVELAND, OF EAST SCHODACK, NEW YORK.

DEWATERING MACHINE.

Application filed May 23, 1921. Serial No. 471,796.

*To all whom it may concern:*

Be it known that I, HENRY BURDETT CLEVELAND, a citizen of the United States, and resident of East Schodack, in the county of Rensselaer and State of New York, have invented certain new and useful Improvements in Dewatering Machines; and I do hereby declare that the following is a full, clear, and exact description thereof.

This invention pertains to improvements in dewatering machines, used in connection with activated sewage sludge or similar material, having low specific gravity, and more particularly to that type employing centrifugal means, commonly known as a centrifuge.

One common method, employed at the present time, of dewatering activated sludge or similar material is to discharge the sludge into a rotatable drum, at a point near its bottom, which imparts rotation to the material and results in the cake or mass, contained in the sludge, being thrown and held into contact with the sides of the drum, while the liquid or effluent overflows and is carried off from the top of the drum. This method embodies many objectionable features, resulting in lower efficiency and consequently small capacity of the machine, due to the fact that sludge discharged at the bottom of the drum will not reach the maximum number of revolutions per minute until it has traveled the entire height of the drum, which results in a slow and inefficient separation of the cake or mass from the effluent, and requires subsequent rehandling of the effluent. Attempts have been made to overcome the foregoing disadvantages by increasing the number of revolutions of the drum. This, however, has been found impractical, due to the great strain and pressure upon the wall of the drum resulting from the increased centrifugal force. A further objection results from the fact that it is impossible to obtain an even flow of sludge, the same being fed by gravity, thereby resulting in vibration of the drum which is injurious to the same and causes great wear upon the supporting bearing.

It is therefore primarily the object of the present invention to overcome these disadvantages and increase the efficiency, and incidentally the capacity of machines of this character by the provision of means adapted to impart rotation to the sludge or similar material before the same comes into contact with the main drum.

A more specific object is to provide auxiliary rotatable means within the main drum adapted to impart rotation to the sludge or material to be dewatered prior to discharging the same into contact with the main drum.

With the foregoing and other objects in view, which will be apparent as the description proceeds, the invention consists in what is herein shown and described and more particularly pointed out and defined by the appended claims.

Figure 1:
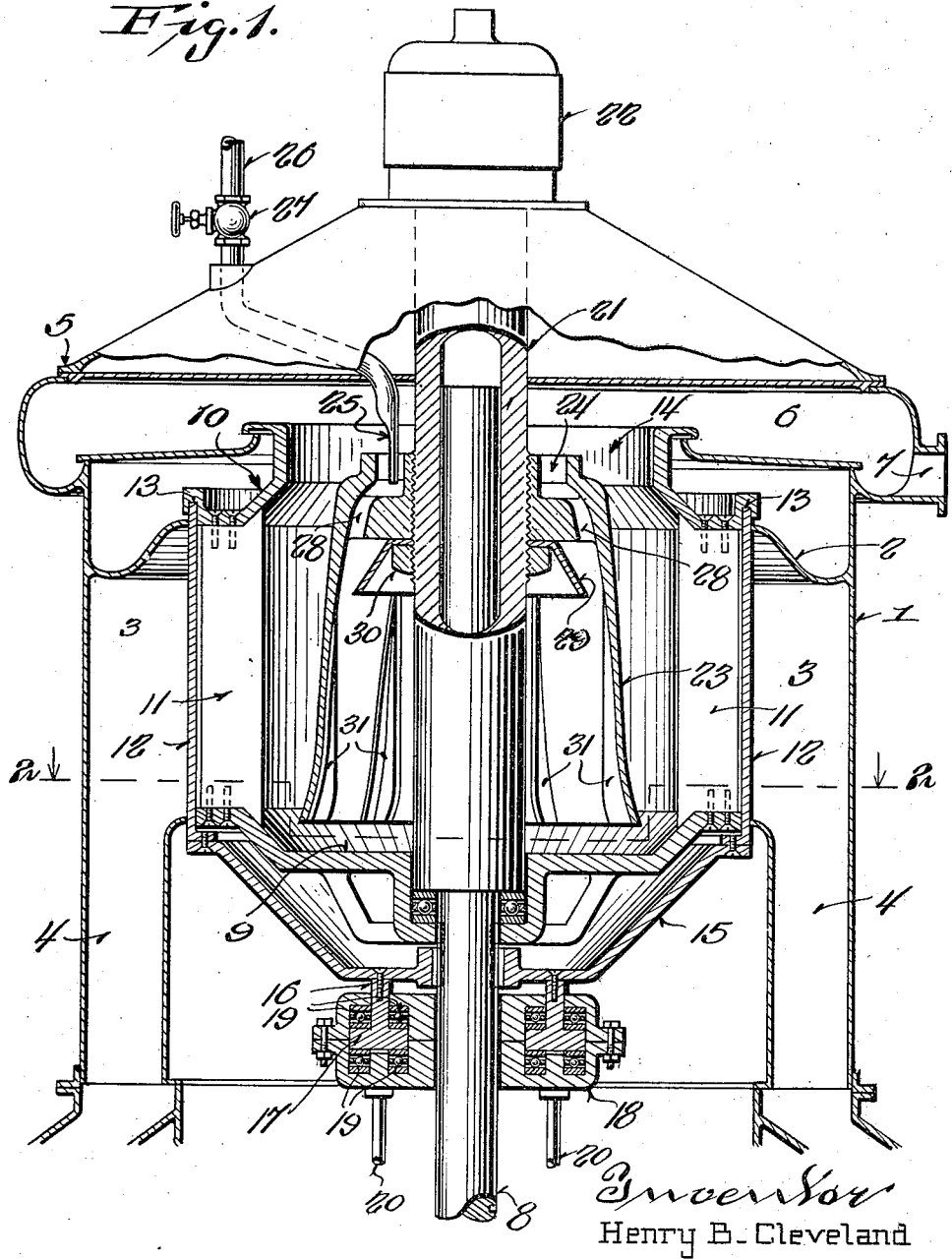
Figure 1 represents an elevational sectional view taken through a machine embodying the features of the invention.
Figure 2:
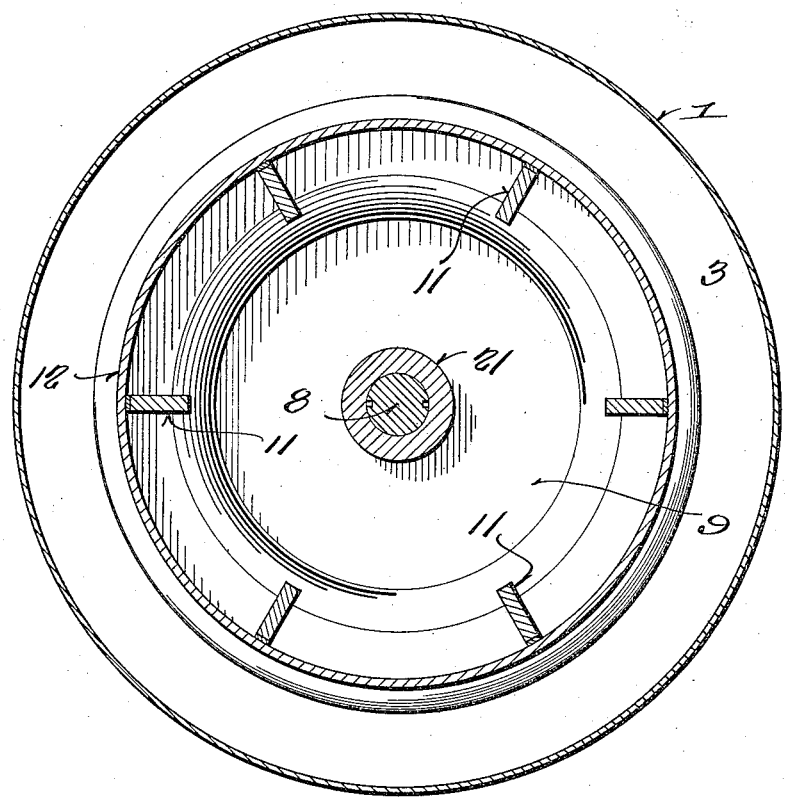
Figure 2 is a transverse sectional view taken upon the line 2—2 of Figure 1.
Figure 3:
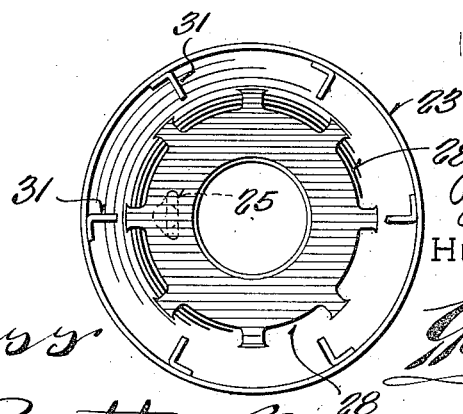
Figure 3 is a detail view looking up upon the auxiliary drum.

Referring now more particularly to the accompanying drawings, the numeral 1 designates an annular casing provided with a dividing flange 2 forming the top of a compartment 3, into which the cake or mass is adapted to be discharged, which compartment has communicating therewith discharge passages 4. The upper portion of the casing is provided with a cover plate 5 forming an annular fluid discharge compartment 6 adapted to receive the effluent and discharge the same through the port 7. Positioned centrally within the casing is a driven shaft 8 to which is secured the bottom 9, and top 10 of the main drum, which bottom and top are spaced apart and connected by stays or ribs 11. An annular ring forms a side wall 12 and is adapted to project into an annular groove 13 provided in the top 10, which top is also provided with a restricted mouth 14 to permit overflow or discharge of the effluent from the drum.

From the foregoing, it will be seen that the top 10 and bottom 9, together with the side wall 12, form the main drum wherein the separation of the cake or mass from the effluent takes place. In the specific showing, as disclosed in the drawings, the drum receives its rotary movement through the connection of its bottom 9 with the driven shaft 8. The usual operation of machines of this character is to discharge sludge or similar material into the main drum at a point adjacent the bottom of the same, while the drum is in motion, the same coming in contact therewith will gradually assume the full number or fraction of revolutions thereof of the drum causing the suspended matter in the sludge to be thrown into contact with the side wall 12, because of centrifugal force.

When a certain amount of cake or mass has accumulated upon the side wall 12 and it is desired to discharge the same from the drum, the flow of sludge is shut off, and while the drum continues to revolve, the side wall 12 is lowered by means of a conical plate 15, secured to the lower edge of the side wall 12 and having a splined connection with the shaft 8. The mass or cake is then discharged because of centrifugal force into the compartment 3. For the purpose of raising and lowering the conical plate 15, the same is provided with a depending annular ring 16 provided with an annular flange 17 at its lowermost end. A split housing 18 surrounds the flange 17 and has, disposed between it and the flange, anti-frictional bearings 19. Secured to the housing 18 and depending therefrom are a plurality of actuating rods 20, which through any suitable means not shown, are adapted to be operated in a vertical direction to raise and lower the housing, which through its connection with the flange 18 will cause the wall 12 to be raised and lowered when desired, and due to the anti-frictional bearings positioned between the housing 18 and flange 17, friction resulting from end thrust will be eliminated.

While I have shown the conical plate 15, which carries the side wall 11, splined to the shaft 18 for the purpose of imparting rotation to the side wall, in some instances, I may desire to eliminate this connection and depend upon rotation of the sludge coming into contact with the bottom and stays to induce motion to the main drum.

Fitted over the shaft 8 and extending into the main drum is a sleeve 21, which is driven by means of a motor 22 mounted at the top of the centrifuge. Threaded on to the sleeve or fastened thereto in any suitable manner is a flared drum 23, whose lower end terminates adjacent the bottom 9. The upper end or head of the drum is provided with an annular pocket 24 into which projects a discharge nozzle 25 of a sludge supply pipe 26 projecting through the cover and provided with a control valve 27. A series of passages 28 connect the annular pocket 24 with the lower portion of the flared drum and permit the sludge discharge into the pocket to pass through the head of the flared drum and into contact with the inner wall of the same. An outwardly tapered apron 29 mounted on the sleeve 21 and secured between the head of the flared drum and a jam nut 30 further tends to direct the sludge against the inner surface of the drum, which inner surface is provided with a plurality of vertical fins or projections 31 adapted to assist in imparting rotary movement to the sludge, and as noted in Figure 1, these projections or fins are slightly tapered and extend upwardly from the lower edge of the drum, terminating intermediate the same and the head thereby imparting a gradual rotation to the sludge and eliminating sudden strain or load upon the drum.

Attention is also directed to the flared inner surface of the drum 23 which is essential to cause the downward travel of the sludge, as it is obvious that were the inner surface of the drum perpendicular, the sludge, and more particularly the mass or cake, would accumulate thereon instead of traveling downward and discharging into the main drum.

While I have shown fins 31 secured to the interior surface of the flared drum, there are instances where I desire to eliminate these and depend entirely upon contact of the sludge with the side of the drum to impart rotation to the sludge. It will further be noted that the drum 23 is mounted upon the sleeve 21, while the main drum derives rotation through its connection with the driven shaft 8. The purpose of this is to permit the inner and outer drum to be driven at different speeds, should it be so desired. It will be appreciated, however, that where I desire to drive both at the same speed, the sleeve 21 may be eliminated and both drums secured to the shaft 8.

From the foregoing it will be seen that a very simple arrangement has been provided, whereby rotation is imparted to the sludge before the same is discharged into contact with the main drum, which insures maximum efficiency of operation and at the same time greater capacity of the machine.

I claim:

1. A machine of the character and for the purpose set forth comprising a main rotary drum, an auxiliary rotary drum mounted within said main drum, said auxiliary drum being opened at its bottom and having its side wall flared outwardly and terminating adjacent the bottom of the main drum, and means for supplying material to the top of the auxiliary drum.

2. A machine of the character and for the purpose set forth comprising a main rotary drum, an auxiliary rotary drum mounted within said main drum, said auxiliary drum having its head provided with an annular pocket and communicating passages between the pocket and interior of the drum, the lower end of the drum being open and terminating adjacent the bottom of the main drum, and means for supplying material to said annular pocket.

3. A machine of the character set forth, comprising a main rotary drum having a restricted discharge throat at its top, an auxiliary rotary drum positioned within the main drum, said auxiliary drum tapering outwardly toward its discharge edge, the discharge edge being of smaller diameter than the discharge throat of the main drum, and means for supplying material to the auxiliary drum.

4. A machine of the character set forth, comprising a main rotary drum having a restricted discharge throat at its top, an auxiliary rotary drum positioned within the main drum, said auxiliary drum tapering outwardly toward its discharge edge, vertical ribs interiorly of the auxiliary drum and projecting from a discharge edge to a point intermediate the top and bottom, and means for supplying material to the auxiliary drum.

5. A machine of the character set forth, comprising a main rotary drum having a restricted discharge throat at its top, an auxiliary rotary drum positioned within the main drum, said auxiliary drum tapering outwardly toward its discharge edge, and vertical ribs interiorly of the auxiliary drum, said ribs tapering from the discharge edge and terminating at a point intermediate the top and bottom.

6. A machine of the character set forth, comprising a main rotary drum having a restricted discharge throat at its top, an auxiliary rotary drum positioned within the main drum, said auxiliary drum tapering outwardly toward its discharge edge, the discharge edge being of smaller diameter than the discharge throat of the main drum, vertical ribs interiorly of the auxiliary drum, said ribs tapering from the discharge edge and terminating at a point intermediate the top and bottom of the auxiliary drum, and means for supplying material to the auxiliary drum.

In testimony that I claim the foregoing I have hereunto set my hand at Milwaukee, in the county of Milwaukee and State of Wisconsin.

HENRY BURDETT CLEVELAND.